United States Patent
Vogt et al.

(10) Patent No.: US 7,394,177 B2
(45) Date of Patent: Jul. 1, 2008

(54) FRAMELESS TORQUE MOTOR WITH A TRANSPORT SECURING DEVICE

(75) Inventors: Stéphane Vogt, Champagne (CH); Nicolas Corsi, Bonvillars (CH); Fabien Dachaud, Pontarlier (FR)

(73) Assignee: Etel S.A., Môtiers (CH)

( * ) Notice: Subject to any disclaimer, the term of this patent is extended or adjusted under 35 U.S.C. 154(b) by 0 days.

(21) Appl. No.: 11/292,850

(22) Filed: Dec. 2, 2005

(65) Prior Publication Data
US 2006/0145566 A1    Jul. 6, 2006

(30) Foreign Application Priority Data
Dec. 16, 2004    (DE) .................. 10 2004 060 506

(51) Int. Cl.
*H02K 5/00* (2006.01)
(52) U.S. Cl. .................... 310/91; 310/254
(58) Field of Classification Search .............. 310/254, 310/91; 29/596
See application file for complete search history.

(56) References Cited

U.S. PATENT DOCUMENTS

| | | | |
|---|---|---|---|
| 5,519,274 A * | 5/1996 | Scharrer | 310/90.5 |
| 5,642,013 A | 6/1997 | Wavre | |
| 5,910,691 A | 6/1999 | Wavre | |
| 5,952,746 A * | 9/1999 | Mittmann et al. | 310/42 |
| 2005/0104461 A1 | 5/2005 | Hatz et al. | |
| 2005/0172150 A1* | 8/2005 | Schmitt | 713/200 |

FOREIGN PATENT DOCUMENTS

| | | |
|---|---|---|
| EP | 0 793 870 B2 | 6/2004 |
| JP | 54-78401 * | 6/1979 |
| JP | 62-155750 * | 12/1985 |
| WO | WO 02/063745 A2 | 8/2002 |
| WO | WO 2004/001932 A1 | 12/2003 |
| WO | WO 2004/030186 A1 | 4/2004 |

* cited by examiner

Primary Examiner—Nguyen N Hanh
(74) Attorney, Agent, or Firm—Brinks Hofer Gilson & Lione

(57) ABSTRACT

A frameless torque motor with a transport securing device wherein the torque motor includes a ferromagnetic primary element and a secondary element, having magnets oriented in a direction toward the primary element, wherein the primary element and the secondary element are fixed to each other by a magnetic force generated by the magnets. A transport securing device that maintains the magnets spaced apart from one another, wherein the transport securing device includes a spacer in an air gap between the primary element and the secondary element.

11 Claims, 1 Drawing Sheet

001
FRAMELESS TORQUE MOTOR WITH A TRANSPORT SECURING DEVICE

Applicants claim, under 35 U.S.C. § 119, the benefit of priority of the filing date of Dec. 16, 2004 of a German patent application, copy attached, Serial Number 10 2004 060 506.8, filed on the aforementioned date, the entire contents of which is incorporated herein by reference.

BACKGROUND OF THE INVENTION

1. Field of the Invention

The present invention relates to a frameless torque motor with a transport securing device, wherein the torque motor has a ferromagnetic primary element and a secondary element with magnets oriented in the direction toward the primary element, which are maintained spaced apart by a transport securing device.

2. Discussion of Related Art

Such torque motors are employed to solve problems in many modern drive mechanisms.

Torque motors are described in EP 793 870 B2, which have a number of magnets on a rotor and a number of coils on a stator on teeth of a core. Such torque motors can create a high torque even with a low number of revolutions. This allows extremely even movements and an excellent capability of regulating the speed. Since the load is coupled directly to the motor while force transmission elements are omitted, these systems offer great dynamics, rigidity and accuracy of regulation superior to all conventional drive mechanisms. Torque motors lower the operating costs, simplify the construction of the machine, show no wear and do not require any maintenance.

Frameless torque motors are directly integrated into the respective application. The position of the rotor and the stator in relation to each other is not defined by a bed of the torque motor of its own, but directly by the structural design of the application. For example, typical applications are turntables or pivot shafts of machine tools, telescopic drive mechanisms or automatic assembly machinery.

Occasionally the rotor and stator of a torque motor are delivered separate from each other. However, for the user this means that he himself has to adjust the parts with respect to each other. This is not an easy job because of the high degree of attraction between the rotor and stator. Customarily such a motor is delivered by the manufacturer already pre-adjusted.

Since torque motors do not have their own bed or do not have their own frame, it is necessary that the rotor and stator are maintained with respect to each other by different devices. Customarily a so-called motor bridge is used as a transport securing device. This includes one or several elements, which are screwed together with the rotor and stator along their circumferences after these had previously been aligned with each other by a centering device.

Since the magnets customarily used in torque motors are very strong, the motor bridges are mostly made of a non-magnetic material, such as aluminum, for example. In this way the motor bridges can be aligned with respect to the motor and fastened without problems. Since the magnetic force between the magnets of the rotor and the core of the stator is very strong, the motor bridges must be made very sturdy. It is absolutely necessary to prevent the magnets of the rotor from touching the core of the stator. The separation of the parts would be very difficult to do. Thus, such motor bridges are relatively elaborate and expensive. It is therefore necessary to return them to the manufacturer of the torque motor after the latter has been installed, which results in a not inconsiderable logistic outlay.

Moreover, such motor bridges hamper the installation of the torque motor in the respective application. It is necessary for the screws for releasing the motor bridge to be still accessible after the motor has been placed in the respective application. There must also be a way to remove the motor bridge. This makes considerable demands on the entire construction. Often the rigid connection between the rotor and the stator makes the installation more difficult, so that the motor bridge must first be loosened for definitely adjusting the installation position and for fixing it in place. Only then can the motor bridge be definitely removed.

OBJECTS AND SUMMARY OF THE INVENTION

It is therefore an object of the present invention to disclose a simpler and more cost-effective securing device for transporting frameless torque motors.

This object is attained in accordance with the present invention by a frameless torque motor with a transport securing device, wherein the torque motor includes a ferromagnetic primary element and a secondary element having magnets oriented in a direction toward the primary element, wherein the primary element and the secondary element are fixed to each other by a magnetic force generated by the magnets. A transport securing device that maintains the magnets spaced apart from one another, wherein the transport securing device includes a spacer in an air gap between the primary element and the secondary element.

In a frameless torque motor, having a ferromagnetic primary element and a secondary element with magnets oriented in the direction toward the primary element, the primary and secondary elements are kept at a distance from each other by a transport securing device. The primary element and the secondary element are fixed in place with respect to each other by the magnetic force of the magnets. The transport securing device includes a spacer arranged in the air gap between the primary element and the secondary element.

The primary element and the secondary element are connected with each other merely by the force of the magnets of the secondary element, and without any screw connection. In this case the spacer is clamped in place on a side of the torque motor in the air gap which is reduced there, by the force of the magnets, so that it cannot fall out of the air gap. It is advantageous, in particular in connection with a multi-piece spacer, if it has ferromagnetic properties. In that case it is also maintained on the side of the torque motor with a widened air gap by the attractive force of the magnets.

Further advantages, as well as details of the present invention ensue from the subsequent description of a preferred exemplary embodiment by the drawings.

DETAILED DESCRIPTION OF THE PREFERRED EMBODIMENTS

Figure 1:
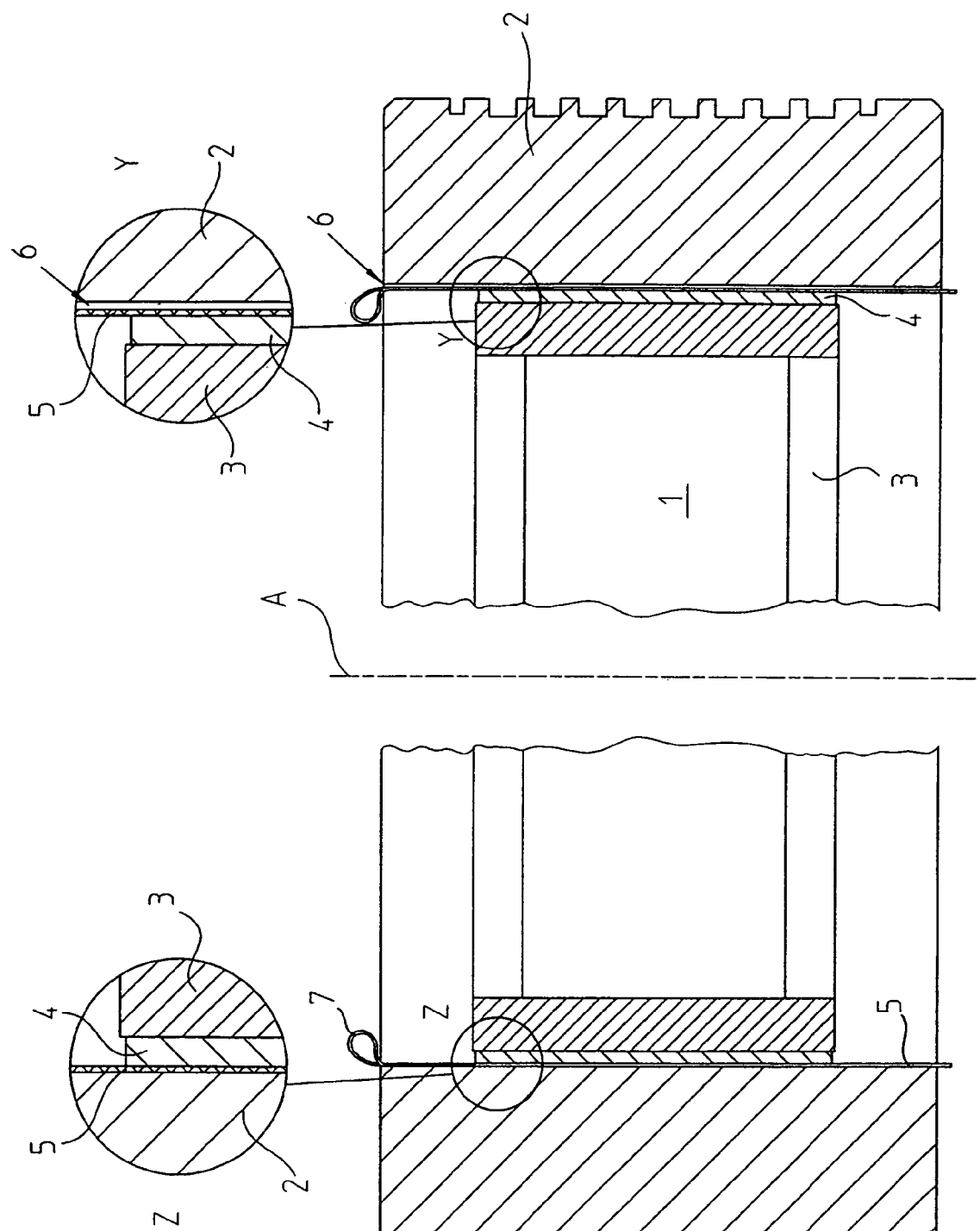
FIG. 1 shows an embodiment of a torque motor with an embodiment of a transport securing device in accordance with the present invention.

FIG. 1 shows a sectional view of a torque motor 1. The sectional plane contains the axis A of rotation of the motor. The primary element 2 of the torque motor 1 contains a core with teeth oriented toward the secondary element 3 and with windings arranged on them. In this example the primary element 2 is designed to be stationary and fastened rigidly to the bed of a turntable, for example. It is therefore also called a stator 2.

The secondary element 3 has magnets 4 oriented toward the primary element 2. It has been designed to be rigidly connected with the respective part of the application, i.e. for example with the rotary plate of the mentioned turntable. By the bearing of the latter, the secondary element 3 is then maintained rotatable in relation to the stator 2. It is therefore also called rotor 3.

The manufacturer of the torque motor 1 must deliver the stator 2 and the rotor 3 either separately to the manufacturer of the respective application, or first pre-adjusted by a centering device and then fixed in place with respect to each other and secured.

A task of the transport securing device 5 in FIG. 1 is the prevention of direct contact of the magnets of the rotor 3 with the stator 2, since this poses a threat of damage, and a separation would be very difficult to perform. A transport securing device 5 which meets these requirements is sufficient, since the stator 2 and the rotor 3 are sufficiently fixed with respect to each other by the force of the magnets 4 of the rotor alone. Since this fixation is not rigid, the installation into the respective application is made easier. The rotor 3 can be moved within definite limits against the magnetic force in the stator 2 and can therefore be shifted into the correct position for installation in the respective application.

In FIG. 1 the transport securing device includes a spacer 5, which has been inserted into the air gap 6 between the rotor 3 and the stator 2 of the torque motor 1. In this case the spacer 5 can include a single encircling tape, but in order to save material it can also include several tape segments.

Because of the magnetic force, the rotor 3 will approach the stator 2 in a radial direction until it encounters the spacer 5 when the torque motor 1 is released from its centering device. Because of this, the air gap 6 between the rotor 3 and the stator 2 on a first side of the torque motor 1 is reduced to the radial thickness of the spacer 5. In the process, the spacer 5 is clamped between the rotor 3 and stator 2. This state is represented in FIG. 1 in the left half of the drawing, in particular in the enlarged section Z. A spacer 5 clamped in this way can no longer fall out of the torque motor.

On a second side opposite the first side of the torque motor 1 (represented in FIG. 1 in the right half of the drawing, in particular in the enlarged section Y), the air gap 6 widens accordingly. Although a one-piece spacer 5 encircling it in the form of a tape would not be clamped on this side, it would not fall out of the torque motor 1, since it would still be clamped on the other motor side. This is different with a multi-piece spacer 5 including several tape elements. There the segments which are not clamped would fall out of the air gap 6.

To avoid this problem, the spacer 5 is preferably made of a material with ferromagnetic properties. It is then assured that the spacer 5 does not fall out of the widened air gap 6, since it is held by the magnets 4. The insertion of the spacer 5 into the air gap 6 is also made easier with a ferromagnetic spacer 5, because the spacer 5 adheres to the magnets 4 of the rotor 3 while the latter is introduced into the stator by the centering device.

The spacer 5 must have a radial thickness which is slightly less than the nominal, i.e. average air gap 6. Furthermore, the radial thickness must be large enough to prevent too strong an adhesion of the rotor 3 to the stator 2. In connection with a typical air gap of approximately 1 mm, a thickness of approximately 0.8 mm has proven itself. Spacers 5 of a thickness of 0.6 mm have been successfully employed in an air gap 6 of 0.7 mm. In general, the radial thickness of the spacer 5 should approximately lie between 40% to 95% of the nominal air gap 6. With lower values the rotor 3 comes too close to the stator 2, with greater values the introduction of the spacer 5 into the air gap 6 becomes uncommonly difficult, because a quite exact centering of the rotor 3 in the stator 2 is required.

Under certain circumstances the employment of spacers 5 of differing radial thickness would be sensible for achieving a better securing of the rotor 3 in the stator 2 in the area of the enlarged air gap 6 against undesired movement in case of strong shocks during transport. It would then be possible to use segments of spacers 5 which in part have a radial thickness of more than 100% of the nominal air gap 6. However, in this case the rotor 3 would already have to be inserted de-centered into the stator 2.

In the axial direction the spacer 5 should protrude out of the air gap 6 at least on one side of the torque motor 1. In this way it can be easily removed after the torque motor 1 has been fixed in place on the respective application. By the fixation, and primarily because of centering in the application, the air gap 6 again becomes uniformly wide. Then the spacer 5 is no longer clamped and only adheres to the magnets 4 of the rotor 3 because of its ferromagnetic properties. It can then be easily pulled out of the torque motor 1. This is additionally made easier if it has a device which makes grasping the spacer 5 easier. Such a grasping aid 7 is represented in FIG. 1. In this case the design of this grasping aid 7 can be arbitrary. For example, it can be a simple hole, through which a finger or a tool can be pushed, or a loop which makes possible the comfortable grasping of the spacer 5.

The material for the spacer 5 should be only slightly compressible in order to assure a minimum distance between the rotor 3 and the stator 2. It should furthermore be capable of resisting shearing forces. The rotor 3 can easily perform small axial movements in the stator 2, which result in a certain shear stress for the clamped spacer 5. But the rotor 3 will never fall out of the stator 2 because it is prevented from this by the prevailing magnetic force.

Moreover, the material for the spacer 5 should have a defined tear resistance in order to absorb the loads when pulling it out of the torque motor. It would be very difficult to remove parts of a torn spacer 5 possibly remaining in the torque motor 1 from the air gap.

A further demand made on the material of the spacer 5 is a certain capability of sliding on the surface material of the rotor 3 in a manner similar to sliding on the material sold under the trademark Teflon. This reduces the force required when removing the spacer 5.

A material having all these properties was found to be a PVC-coated magnetic foil, such as is also used for producing magnetic signs which can be applied to motor vehicles, for example, for advertising purposes. Such magnetic foils are flexible and have a ferromagnetic core. They are also called magnetic rubber. They are provided with good sliding capabilities by the additional coating with plastic, preferably PVC coating.

The fact that these magnetic foils in their commercially available form are already magnetized does not interfere with fastening on the rotor 2 since, on the one hand the magnetization of the latter is much stronger than that of the magnetic foil, on the other hand this magnetization can even make the handling of the magnetic foil easier. For example, two thin magnetic foils can be combined to form a double- or multi-layered shape, which can then be used as spacer 5. In this way only one type of magnetic foil is needed for different torque motors 1 with different air gaps 6. Furthermore, magnetization also makes it possible to initially fasten the spacer to the core of the stator 2 and then to introduce the rotor 3. Under certain conditions this can be advantageous and would be impossible with a non-magnetized material, since the stator 2 itself cannot put out magnetically-attractive forces. A pleasant side effect of the magnetization of the spacers 5 also is that they can be easily stacked in spite of their smooth surfaces and dependably stored on metallic shelves, for example.

Such a magnetic foil can either be used again, or also easily disposed of. Compared with motor bridges from the prior art, it does not represent a substantial cost factor.

It should also be noted that the arrangement of the primary element and secondary element can differ from the exemplary embodiment here described. The magnets of the rotor can lie on the outside. Also, the secondary element, i.e. the element with the magnets on the inside or the outside, can be fixedly connected with the immovable part of an application as the stator. In each case the torque motor will have an air gap in which a spacer 5 can be used as transport securing device.

The foregoing description is provided to illustrate the invention, and is not to be construed as a limitation. Numerous additions, substitutions and other changes can be made to the invention without departing from its scope as set forth in the appended claims.

We claim:

1. A frameless torque motor with a transport securing device, wherein said torque motor comprises:
   a ferromagnetic primary element;
   a secondary element comprising magnets oriented in a direction toward said ferromagnetic primary element, wherein said ferromagnetic primary element and said secondary element are fixed to each other by a magnetic force generated by said magnets; and
   a transport securing device that maintains said ferromagnetic primary element and said secondary element spaced apart from one another, wherein said transport securing device comprises a spacer comprising a flexible foil which is inserted into an air gap between said ferromagnetic primary element and said secondary element.

2. The frameless torque motor in accordance with claim 1, wherein on a first side of said torque motor said air gap is reduced to a radial thickness of said spacer, and said spacer is therefore clamped between said primary element and said secondary element.

3. The frameless torque motor in accordance with claim 2, wherein said spacer is ferromagnetic.

4. The frameless torque motor in accordance with claim 2, wherein on a second side of said torque motor located opposite said first side, said air gap is larger than said radial thickness of said spacer, and that because of its ferromagnetic properties said spacer is held in said air gap by said magnets.

5. The frameless torque motor in accordance with claim 1, wherein said spacer is ferromagnetic.

6. The frameless torque motor in accordance with claim 1, wherein said flexible foil is selected from the group consisting of a magnetic foil and magnetic rubber.

7. The frameless torque motor in accordance with claim 6, wherein said flexible foil is coated with plastic.

8. The frameless torque motor in accordance with claim 1, wherein said flexible foil is coated with plastic.

9. The frameless torque motor in accordance with claim 1, wherein said flexible foil is magnetized.

10. The frameless torque motor in accordance with claim 1, wherein said transport securing device projects in said axial direction out of said air gap.

11. The frameless torque motor in accordance with claim 10, wherein outside of said air gap said transport securing device has a grasping aid.

\* \* \* \* \*